United States Patent [19]

Nakhamkin

[11] Patent Number: 5,347,806
[45] Date of Patent: Sep. 20, 1994

[54] CASCADED ADVANCED HIGH EFFICIENCY MULTI-SHAFT REHEAT TURBINE WITH INTERCOOLING AND RECUPERATION

[75] Inventor: Michael Nakhamkin, Mountainside, N.J.

[73] Assignee: Cascaded Advanced Turbine Limited Partnership, Mountainside, N.J.

[21] Appl. No.: 52,948

[22] Filed: Apr. 23, 1993

[51] Int. Cl.$^5$ .......................... F02C 3/04; F02C 7/10
[52] U.S. Cl. ........................... 60/39.161; 60/39.17;
                                              60/39.511; 60/728
[58] Field of Search ............ 60/39.161, 39.17, 39.182,
       60/39.511, 39.512, 39.07, 39.163, 39.183, 39.53,
                                                         728

[56] References Cited

U.S. PATENT DOCUMENTS

| | | |
|---|---|---|
| 2,482,791 | 9/1949 | Nettel et al. . |
| 2,567,581 | 9/1951 | Salter . |
| 2,584,232 | 2/1952 | Sedille .................. 60/39.17 |
| 2,625,012 | 1/1953 | Larrecq . |
| 2,626,502 | 1/1953 | Lagelbauer . |
| 2,633,707 | 4/1953 | Hermitte et al. .................... 60/39.17 |
| 2,655,364 | 10/1953 | Maldague . |
| 2,758,827 | 8/1956 | Pfenninger ........................ 60/39.511 |
| 3,048,018 | 8/1962 | Nicolin . |
| 3,325,992 | 6/1967 | Sheldon . |
| 3,962,864 | 6/1976 | Williams et al. . |
| 4,368,616 | 1/1983 | Abo et al. . |
| 4,896,499 | 1/1990 | Rice . |
| 5,105,617 | 4/1992 | Malohn ............................. 60/39.511 |

FOREIGN PATENT DOCUMENTS

749263  5/1956  United Kingdom .............. 60/39.511

OTHER PUBLICATIONS

G. R. Barr et al. "Turbomachinery Development and Solar's Product Line Evolution"—Turbomachinery Technology Seminar (1989).

L. F. Giannuzzi et al. "Optimization of Gas Turbine Cycles with Variable Number of Combustion, Compressor, and Inter-cooler Stages" ASME 81-JPGC-G-T-6 (1981).

*Primary Examiner*—Louis J. Casaregola
*Attorney, Agent, or Firm*—Cushman, Darby & Cushman

[57] ABSTRACT

An electric power generation system including a power shaft assembly including a combustion turbine with a compressor, an expansion turbine, a combustor feeding the expansion turbine, an electrical generator, and a shaft for coupling the expansion turbine to drive the compressor and the electrical generator; an additional shaft assembly including an intercooler, a compressor, an expansion turbine, a combustor feeding the expansion turbine, and a driver for driving the compressor of the additional shaft assembly, the compressor of the additional shaft assembly being constructed and arranged to have a pressure ratio greater than a pressure ratio of the expansion turbine of the additional shaft assembly which is fluid connected to the power shaft assembly for pressure unloading the compressor of the power shaft assembly; a recuperator; and an exhaust stack. The power shaft assembly, the additional shaft assembly and the recuperator are connected to define a thermal cycle with an air and gas path that passes through the compressor of the power shaft assembly, through the intercooler and compressor of the additional shaft assembly, through the recuperator, through the combustor and expansion turbine of the additional shaft assembly and through the combustor and expansion turbine of the power shaft assembly, and finally exhausting through the recuperator to the exhaust stack.

14 Claims, 4 Drawing Sheets

CASCADED ADVANCED HIGH EFFICIENCY MULTI-SHAFT REHEAT TURBINE WITH INTERCOOLING AND RECUPERATION

BACKGROUND OF THE INVENTION

1. Field of the Invention

This invention relates to combustion turbine engines with inter cooling, saturation, recuperation and reheat.

2. Description of Related Art

A typical and currently available simple cycle combustion turbine consists of a compressor for compressing the atmospheric air, a combustor for heating the compressed air, a turbine for power production and an electric generator for converting mechanical energy into electrical energy. A more sophisticated combustion turbine concept with a number of compressors with intercoolers and with a number of turbines with associated combustors and, also, with a recuperator, has been theoretically known at least since the 1920's.

Major features of the conventional, generic combustion turbine concept as disclosed in the article entitled "Optimization of Gas Turbine Cycles with Variable Number of Combustion, Compressor and Intercooler Stages", document no. 81-JPGC-CT-6 published in 1981 by the Americal Society of Mechanical Engineers, are as follows:

- The highest pressure turbine with associated combustor has the highest inlet temperature. The lower pressure turbines with associated combustors have the same (as the highest pressure turbine) inlet temperature;
- The expansion pressure ratios of all turbines are equal; and
- The compression ratios of all compressors are equal Earlier patents, for example, U.S. Pat. No. 2,584,232 to Sedille utilize this generic theoretical combustion turbine cycle with the aforementioned features. The major thrust of these patents is the utilization of available and otherwise wasted heat resources of the generic theoretical combustion turbine concept for improving the resulting power plant efficiency. These heat resources are used for steam generation and additional electric power production by the bottoming steam turbine or via steam injection.

No practical applications of this prior art theoretical combustion turbine cycle have been established, due to a number of engineering problems facing the power plant designers.

The first and the most important engineering problem is that the highest pressure turbine for the prior art combustion turbine concept has the highest inlet temperature. This presents a serious challenge because of high thermal and transient stresses in the high pressure and temperature turbine components, and requires special materials and engineering yet to be developed.

The second engineering problem is a result of the fact that for a typical prior art concept a plurality of combustion turbines with the same inlet temperatures and equal pressure ratios have very high exhaust gas flow temperatures which are the inlet temperatures for a plurality of downstream combustors. This is yet another serious engineering challenge.

3. Objects of the Invention

An object of this invention is to develop a new combustion turbine with improved efficiency and economics which embodies a properly integrated plurality of turbines with reheat, a plurality of compressors with intercoolers, a recuperator, saturator, water heaters, duct burners, and a heat recovery steam generator.

Yet another object of this invention is an integration of a saturator in the combination turbine concept to improve the combustion turbine thermal efficiency and to increase the specific production of electric power per pound of air. The saturator, via heat and mass exchange, preheats the compressed air and saturates it with moisture before entering a recuperator.

Another object of the invention is to incorporate a recuperator and water heaters into the inventive combustion turbine concept for better utilization of the combustion turbine cycle available heat with associated improvement of the thermal efficiency.

Still another object of the invention is a maximum utilization of the available prior art simple cycle combustion turbine components with the addition of currently available industrial components properly integrated into the inventive cycle in order to facilitate practical implementation of the inventive concept.

Yet a further object of this invention is to provide a heat recovery steam generator for the alternative utilization of the exhaust gas heat, for steam use in the bottoming cycle and/or for steam injection into one of the plurality of turbines.

A further object of the invention is to provide duct burners strategically positioned in locations of the system to improve the efficiency and economics of the system further.

SUMMARY OF THE INVENTION

The major theoretical and conceptual features of the invention are set forth in the new combustion turbine thermal cycle shown in FIG. 2 on a temperature-entropy diagram.

The foregoing, and additional, objects are attained in accordance with the principles of this invention by providing an electric power generating system which comprises an electric generator and a power shaft assembly including a compressor, an expansion turbine, a combustor feeding heated air to the expansion turbine, and means for coupling the expansion turbine to drive the compressor and the electric generator. According to this invention, at least one additional shaft assembly is provided. Each additional shaft assembly includes a compressor, an intercooler, an expansion turbine, a combustor, and means for coupling the expansion turbine of the additional shaft assembly to drive the compressor of the additional shaft assembly. Further, a recuperator and optional duct burners are provided. According to this invention, the power shaft assembly, the at least one additional shaft assembly, and the recuperator are connected to define an air and gas path that passes through the compressor of the power shaft assembly, through the intercooler and the compressor of each of the at least one additional shaft assembly in a first predetermined ordered sequence, through the recuperator, through the combustor and the expansion turbine of each of the at least one additional shaft assembly in a second predetermined ordered sequence, through the combustor and expansion turbine of the power shaft assembly, through the recuperator and to the exhaust stack. Accordingly, incoming air is alternately compressed and cooled as it passes through the compressors of the power and additional shaft assemblies, is heated in the heat recuperator, and is alternately heated and expanded as its combustion product gas passes through the combustors and the expansion turbines of the additional and power shaft assemblies. The water for the inter coolers is provided from either a cooling tower or other source.

In accordance with an aspect of this invention, in each of the additional shaft assemblies, the compression pressure ratio of the compressor is greater than the expansion pressure ratio of the expansion turbine. Therefore, for total pressure balance the compression pressure ratio of the power shaft assembly compressor is less than the expansion pressure ratio of the power shaft assembly expansion turbine. In effect, the compressor of the power shaft assembly is partially unloaded so that the expansion turbine of the power shaft assembly can supply more of its power to the electric generator.

In accordance with a further aspect of this invention, exhaust gas from the power shaft assembly expansion turbine is directed to the heat recuperator so as to provide a heat source therefor.

In accordance with yet a further aspect of this invention, the multi-shaft arrangement (power shaft and at least one additional shaft assembly) provides for convenient and economical location of inter coolers. This allows an increase in the pressure ratio of compressors of the power balanced additional shaft assemblies, thus further unloading the compressor of the power shaft assembly, which, in turn, provides additional power for electric power generator and increases efficiency.

In accordance with still yet a further aspect of this invention, the saturator saturates the compressed air, thus further reducing the air requirements per kilowatt-hour produced with association reduction of power consumption by the compressors of the additional shaft assemblies and by the compressor of the power shaft assembly.

Further yet, in accordance with a further aspect of this invention, hot water required for the compressed air saturation in the saturator is produced in water heaters (recovering the heat available in the exhaust gas leaving the power shaft assembly turbine after partial heat recovery in the recuperator) and in the intercoolers and aftercooler (recovering the compressed air heat).

Still further yet, in accordance with a further aspect of this invention, the steam generated in the heat recovery steam generator produces additional power via steam injection or in the bottoming cycle.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
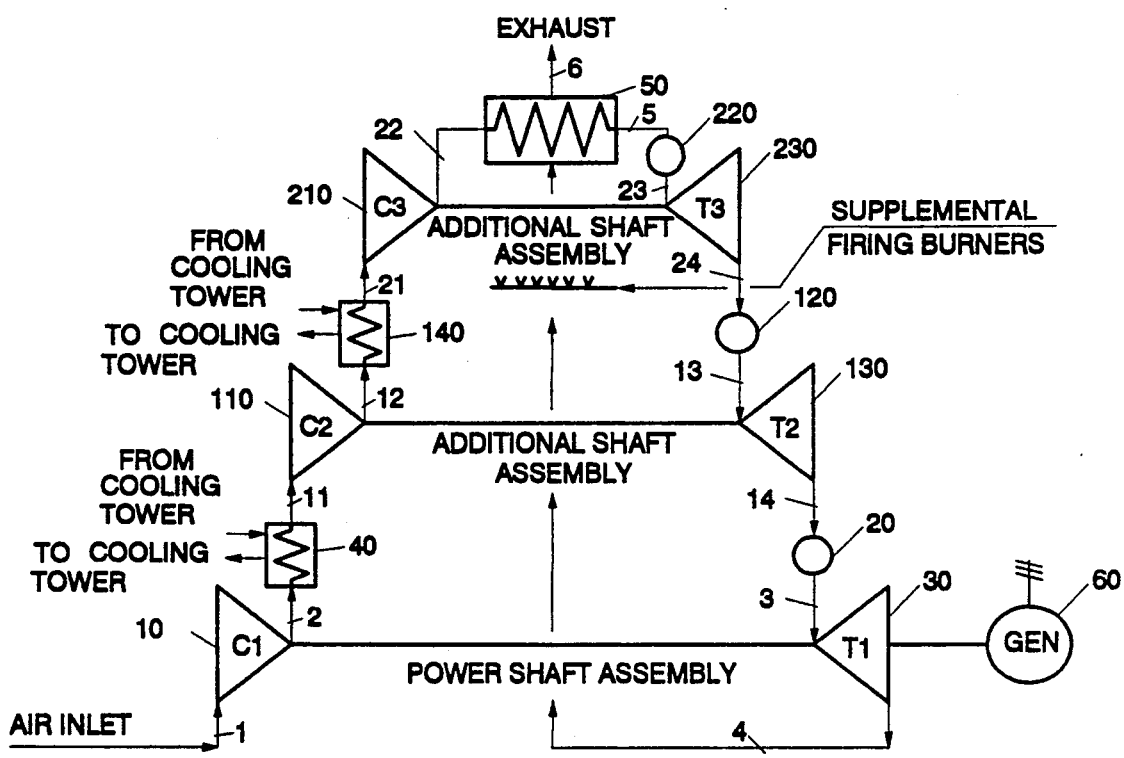
FIG. 1 is a schematic diagram of a first illustrative embodiment of an electric power generating system according to the present invention.

FIG. 1 is a schematic representation of a first illustrative embodiment of an electric power generating system according to this invention. The power shaft assembly represents a conventional heavy duty combustion turbine or an aircraft derivative combustion turbine which includes the compressor 10, the expansion turbine 30, the combustor 20 which feeds heated combustion product gas to the expansion turbine, the expansion turbine 30 being coupled to drive the compressor 10 and the electric generator 60. In a standard application, air which enters the low pressure compressor 10 at its inlet I is compressed thereby and provided at its outlet 2. The compressed air is discharged directly to the low pressure combustor 20 and then expanded through the low pressure expansion turbine 30. In the conventional arrangement, the power output of the turbine 30 is substantially equally divided for driving the compressor 10 and the generator 60.

In accordance with this invention, at least one additional shaft assembly is provided to modify the conventional power shaft assembly described above. Illustratively, two additional shaft assemblies are shown. Also, a heat recuperator 50 is provided. Thus, the first additional shaft assembly includes the intercooler 40, the intermediate pressure compressor 110, the intermediate pressure combustor 120 and the intermediate pressure expansion turbine 130. The second additional shaft assembly includes the high pressure intercooler 140, the high pressure compressor 210, the high pressure combustor 220 and the high pressure expansion turbine 230. The intercoolers 40 and 140 are cooled by water supplied from a cooling tower.

Figure 2:
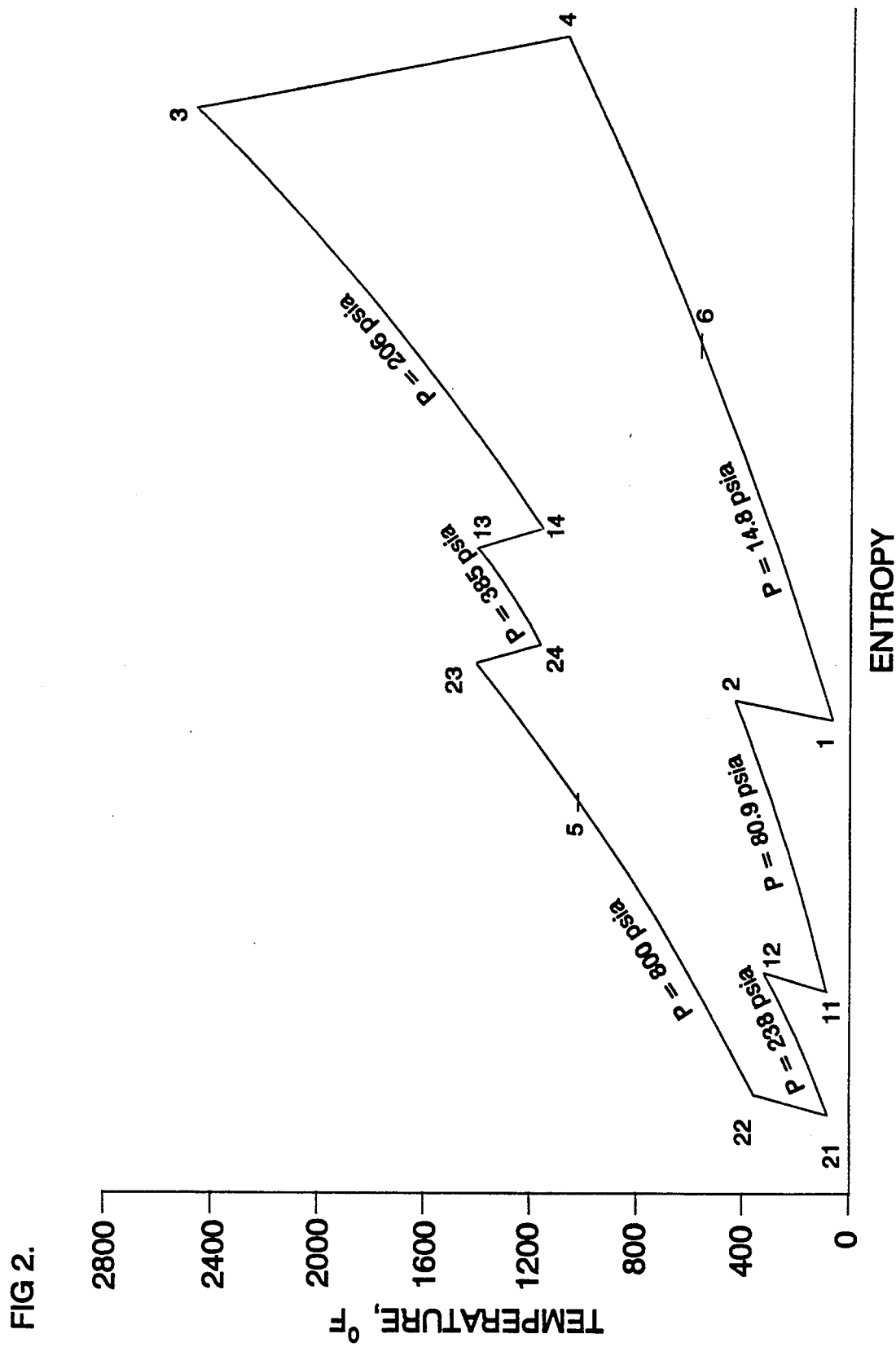
FIG. 2 is a temperature-entropy diagram for the system of FIG. 1.

As shown, the air and gas path extends through the modified compressor of the conventional power shaft assembly, through the intercoolers and compressors of the additional shaft assemblies, through the recuperator, through the combustors and expansion turbines of the additional shaft assemblies, and then through the combustor and expansion turbine of the conventional power shaft assembly. Thus, the exhaust 2 of the low pressure compressor 10 passes through the intercooler 40 which reduces its temperature at the inlet 11 of the intermediate compressor 110. The pressure of the air is then again raised and provided at the exhaust 12 of the compressor 110 to the intercooler 140 which lowers its temperature and provides the cooled intermediate pressure air at the inlet 21 to the high pressure compressor 210. The exhaust 22 of the high pressure compressor 210 is provided as an input to the heat recuperator 50. The outlet 5 of the heat recuperator 50 is connected to the high pressure combustor 220, whose outlet 23 is provided to the high pressure expansion turbine 230. The exhaust 24 of the high pressure expansion turbine 230 is heated in the intermediate pressure combustor 120 and then provided to the inlet 13 of the intermediate pressure expansion turbine 130. The exhaust 14 of the intermediate pressure expansion turbine 130 is heated in the low pressure combustor 20 and then provided to the inlet 3 of the low pressure expansion turbine 30, the exhaust 4 of which is utilized as a heat source for the heat recuperator 50, before going to the system exhaust 6. The thermodynamic cycle is shown as the temperature-entropy diagram of FIG. 2.

Conventionally, when a simple cycle power shaft assembly is utilized, the compression pressure ratio of the compressor equals the expansion pressure ratio of the pressure ratio of the turbine, and the output combustion turbine power from the turbine is substantially equally divided for driving the compressor and the electric generator. However, according to the present invention, the compression compressor 10 is substantially reduced so that turbine 30 can supply more of its power for driving generator 60. This lowering of the compression pressure ratio of the compressor 10 is accompanied by raising the overall compression pressure ratio of the additional shaft assemblies over the overall expansion pressure ratio of the additional shaft assemblies. By introducing the intercoolers 40 and 140, the temperature of the air entering the compressors 110 and 210 is reduced, which reduces the power consumed by the compressors 110 and 210, and for the same power consumption by the compressors allows for increased compression pressure ratios.

Figure 3:
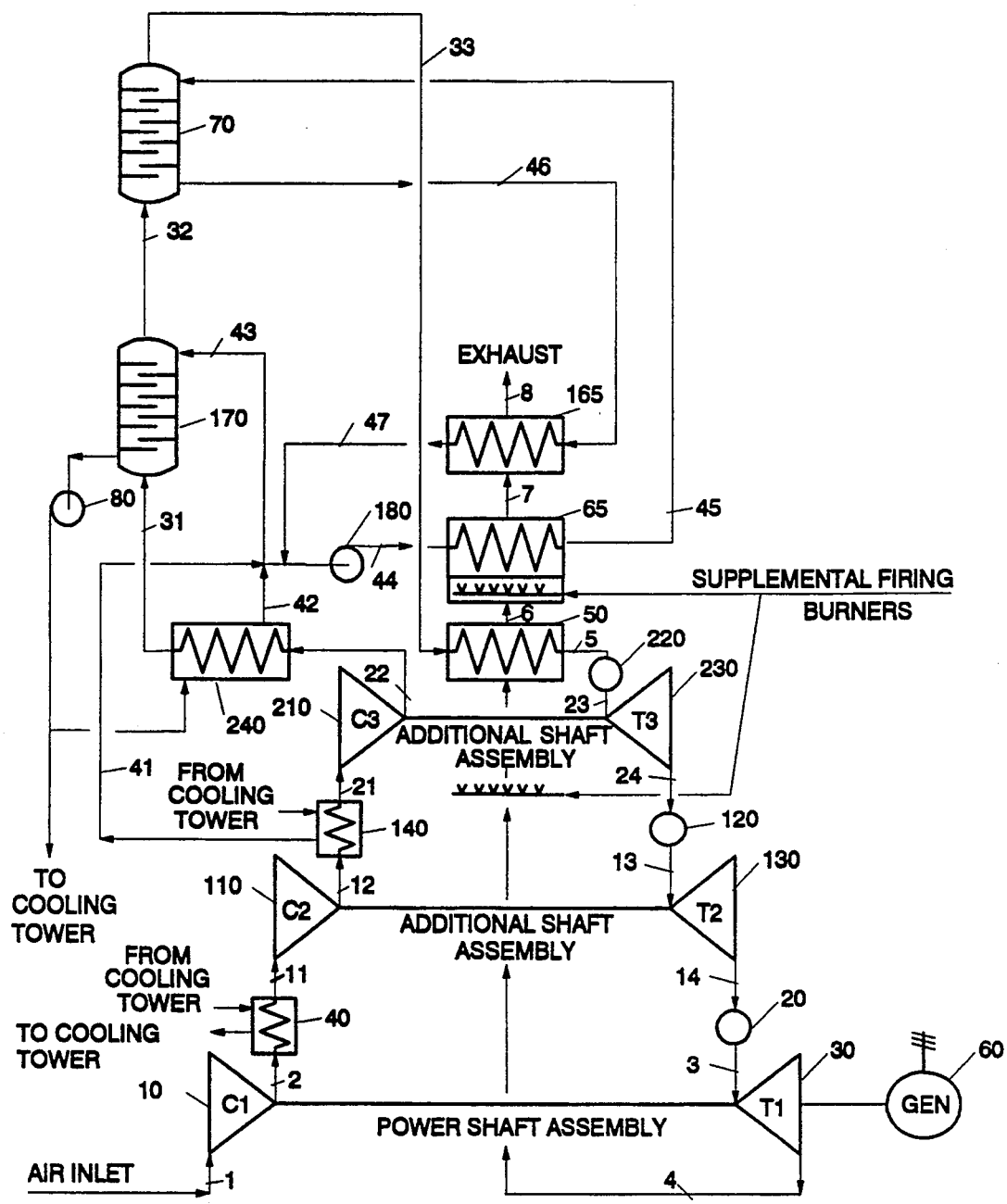
FIG. 3 is a schematic diagram of a second illustrative embodiment of an electric power generating system according to the present invention.

FIG. 3 illustrates a modification to the system shown in FIG. 1 which further includes an aftercooler 240 and water saturators 170 and 70 connected between the output of the high pressure compressor 210 and the inlet of the heat recuperator 50. Thus, from the outlet 22 of the high pressure compressor 210, the compressed air is cooled in the aftercooler 240 and then directed into the inlet 31 of the saturator 170 and into the inlet 32 of the saturator 70, where the compressed air is saturated with water and preheated before entering the inlet 33 of the heat recuperator 50. The remainder of the air and gas path is identical to that of FIG. 1. The saturators 170 and 70 are fed by water which has been heated in intercooler 140 and aftercooler 240, and the exhaust gas heat recovering water heaters 65 and 165. The water flow paths, including the pumps 80 and 180, are readily apparent from FIG. 3. If desired, the recuperator 50 and the water heater 65 can be supplementally fired by the installation of duct burners.

Figure 4:
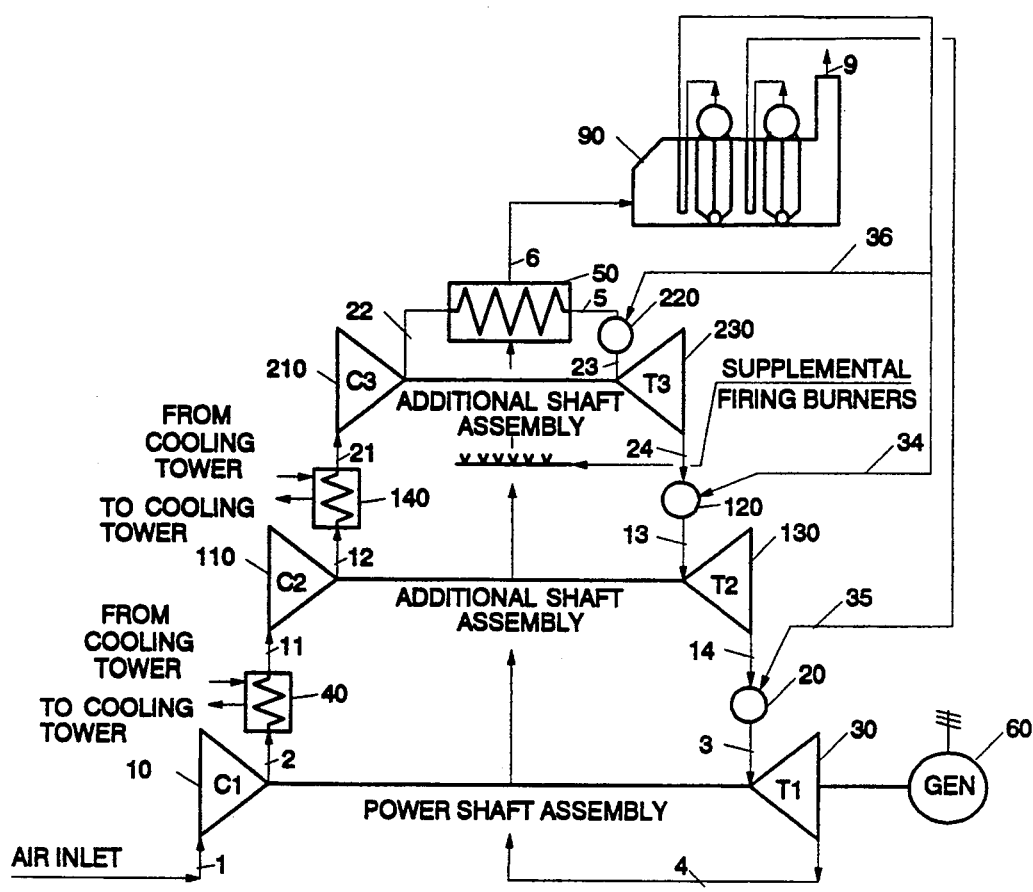
FIG. 4 is a schematic diagram of a third illustrative embodiment of an electric power generating system according to the present invention.

The system shown in FIG. 3 has been shown to have a significantly higher efficiency (up to approximately 53% with state of the art combustion turbines) over the basic system shown in FIG. 1 (approximately 47% efficiency), but the increased efficiency has some penalties. Thus, the system shown in FIG. 3 requires a significant amount of make-up water and therefore may have some siting limitations. Further, the system shown in FIG. 3 with saturators is more complicated when compared with the basic system shown in FIG. 1, although it is significantly simpler in engineering and operation as compared to a combined cycle plant with a comparable efficiency. The specific capital cost, in dollars per kilowatt, for the system of FIG. 3 is between the cost of FIG. 4 illustrates another modification to the system of FIG. 1 wherein the exhaust 6 from the heat recuperator 50 is directed to the heat recovery steam generator 90 to produce steam which may be injected into one or more of the combustors 20, 120 and 220. The remainder of the system is the same as that shown in FIG. 1.

The following TABLE 1 presents performance and key point parameters for the inventive system, which are compared to those for a simple cycle combustion turbine.

TABLE 1

| | | | | | | |
|---|---|---|---|---|---|---|
| GAS TURBINE MODEL | W501F Simple Gas Turbine | Modified W501F Gas turbine W/Recuperator | Two Shaft Intercooled Reheat Gas turbine W/Recuperator | Three Shaft Intercooled Reheat Gas turbine W/Recuperator (FIG. 1) | Three Shaft Intercooled Reheat Gas turbine W/Recuperator & Saturators (FIG. 3) | Three Shaft Intercooled Reheat Gas turbine W/Recuperator & Steam injection (FIG. 4) |
| PERFORMANCE DATA | | | | | | |
| Gross Power, MW | 154.5 | 149.6 | 196.4 | 223.8 | 261 | 239.8 |
| Gross Heat Rate, Btu/kWh | 9,330 | 8,276 | 7,826 | 7,454 | 6,460 | 7,029 |
| Overall Pressure Ratio | 14.0 | 14.7 | 34.0 | 54.4 | 54.4 | 54.4 |
| Gross Efficiency, % | 36.6 | 41.2 | 43.6 | 45.8 | 52.8 | 48.5 |

MAJOR CYCLE PARAMETERS AT KEY CYCLE POINTS

| STATE POINTS | PARAMETRS | | | | | | |
|---|---|---|---|---|---|---|---|
| 1 | Pressure, psia | 14.7 | 14.7 | 14.7 | 14.7 | 14.7 | 14.7 |
| | Temperature, °F. | 59 | 59 | 59 | 59 | 59 | 59 |
| | Inlet Air Flow, lb/sec | 943 | 949 | 942 | 941 | 770 | 826 |
| 2 | Pressure, psia | 206 | 216 | 120.1 | 80.9 | 54.3 | 72.62 |
| | Temperature, °F. | 714 | 731 | 539 | 426 | 324 | 397 |
| 3 | Pressure, psia | 195.5 | 195.5 | 195.5 | 195.5 | 195.5 | 195.5 |
| | Temperature, °F. | 2462 | 2462 | 2462 | 2462 | 2458 | 2462 |
| 4 | Pressure, psia | 14.8 | 15.1 | 15.1 | 15.1 | 15.1 | 15.1 |
| | Temperature, °F. | 1074 | 1069 | 1069 | 1070 | 1130 | 1117 |
| | Exhaust Flow, lb/sec* | 962 | 965 | 958 | 958 | 878 | 900 |
| 5 | Pressure, psia | N/A | 216 | 485 | 785 | 772 | 785 |
| | Temperature, °F. | | 1018 | 1018 | 1018 | 1072 | 1061 |
| 6 | Pressure, psia | N/A | 14.7 | 14.7 | 14.7 | 14.9 | 14.9 |
| | Temperature, °F. | | 855 | 602 | 564 | 546 | 644 |
| 11 | Pressure, psia | N/A | N/A | 116 | 78.1 | 52.4 | 70.1 |
| | Temperature, °F. | | | 80 | 80 | 80 | 80 |
| 12 | Pressure, psia | N/A | N/A | 500 | 244.5 | 200.8 | 249 |
| | Temperature, °F. | | | 412 | 318 | 369 | 350 |
| 13 | Pressure, psia | N/A | N/A | 465.5 | 384.5 | 382 | 387 |
| | Temperature, °F. | | | 1400 | 1400 | 1400 | 1400 |
| 14 | Pressure, psia | N/A | N/A | 206 | 206 | 206 | 206 |
| | Temperature, °F. | | | 1095 | 1163 | 1174 | 1164 |
| 21 | Pressure, psia | N/A | N/A | N/A | 238 | 195.7 | 242.9 |
| | Temperature, °F. | | | | 80 | 80 | 80 |
| 22 | Pressure, psia | N/A | N/A | N/A | 800 | 800 | 800 |
| | Temperature, °F. | | | | 354 | 410 | 350 |

TABLE 1-continued

PERFORMANCE DATA

| GAS TURBINE MODEL | | W501F Simple Gas Turbine | Modified W501F Gas turbine W/Re-cuperator | Two Shaft Intercooled Reheat Gas turbine W/Recuperator | Three Shaft Intercooled Reheat Gas turbine W/Recuperator (FIG. 1) | Three Shaft Intercooled Reheat Gas turbine W/Recuperator & Saturators (FIG. 3) | Three Shaft Intercooled Reheat Gas turbine W/Recuperator & Steam injection (FIG. 4) |
|---|---|---|---|---|---|---|---|
| 23 | Pressure, psia | N/A | N/A | N/A | 747 | 734.3 | 770 |
|  | Temperature, °F. |  |  |  | 1400 | 1400 | 1400 |
| 24 | Pressure, psia | N/A | N/A | N/A | 400 | 398 | 403.6 |
|  | Temperature, °F. |  |  |  | 1162 | 1174 | 1164 |
| 8/9 | Pressure, psia | N/A | N/A | N/A | N/A | 14.7 | 14.7 |
|  | Temperature, °F. |  |  |  |  | 319 | 362 |
| 31 | Pressure, psia | N/A | N/A | N/A | N/A | 788 | N/A |
|  | Temperature, °F. |  |  |  |  | 280 |  |
| 33 | Pressure, psia | N/A | N/A | N/A | N/A | 787 | N/A |
|  | Temperature, °F. |  |  |  |  | 345 |  |
|  | Mass % of moisture in moist air |  |  |  |  | 12.6 |  |
| 34 | HP STEAM |  |  |  |  |  |  |
|  | Pressure, psia | N/A | N/A | N/A | N/A | N/A | 450 |
|  | Temperature, °F. |  |  |  |  |  | 610 |
|  | Mass Flow, lb/sec |  |  |  |  |  | 47.9 |
| 35 | LP STEAM |  |  |  |  |  |  |
|  | Pressure, psia | N/A | N/A | N/A | N/A | N/A | 300 |
|  | Temperature, °F. |  |  |  |  |  | 440 |
|  | Mass Flow, lb/sec |  |  |  |  |  | 7.8 |

NOTE
*Includes Air, Moisture and Fuel

It should be noted that the performance characteristics presented in TABLE i are based on the current level of technology development and on the performance characteristics of Westinghouse's W501F combustion turbine as the source of the power shaft assembly combustion turbine and the performance characteristics of commercial turbo-expanders and compressors for the additional shaft assemblies. For example, the power shaft assembly turbine 30 inlet temperature is assumed to be $T_3 = 2462°$ F. (FIG. 2), corresponding to the current level of inlet temperatures for advanced simple cycle combustion turbines. Also, the inlet temperature to the expansion turbines 230 and 130 is assumed to be $T_{23} = T_{13} = 1400°$ F., which is relatively low and corresponds to the current inlet temperature of available industrial expansion turbines. Increasing the inlet temperature of the turbines 230 and 130 from 1400° F. to 1600° F. (a practical next level) will increase the efficiency of the inventive system by approximately absolute 3% (45.8% efficiency will become 48.8% efficiency). It is noted that any advanced developments in combustion turbine technology are fully applicable to the inventive system.

TABLE 1 shows the advantages of other embodiments of the inventive concepts. Thus, the second embodiment (FIG. 3), with the addition of a saturator, associated aftercooler and waste heat water heaters, has a gross efficiency of 52.8%, as compared to an efficiency of 36.6% for the state of the art combustion turbine. TABLE 1 also shows that the third embodiment (FIG. 4) of the inventive concept with use of the heat recovery steam generator shows an efficiency of 48.5%.

The major attractiveness of the described system is in its originality, effectiveness and what is most important, simplicity of implementation. The power shaft assembly is a standard commercially available combustion turbine. The modifications required are relatively minor. First, the low pressure compressor 10 pressure ratio has to be reduced to below the pressure ratio of its associated expansion turbine. the power-balanced additional shaft assemblies have compression pressure ratios of compressors 110 and 210 which are higher than the corresponding expansion pressure ratios of the turbines 230 and 130. For the same overall compression pressure ratio, this in turn reduces the required compression pressure ratio for the low pressure compressor 10. Then, the generator 60 is upgraded for the higher power generating capacity of the plant. Also, the power shaft assembly is thrust balanced either by upgrading the existing thrust bearing or by the addition of an external thrust bearing connected to the power shaft assembly. The easiest way of reducing the pressure ratio of the compressor 10 is by deblading a number of its last stages, which can be performed by a manufacturer or by any packager or any utility. The additional shaft assemblies can be supplied by industrial turbo-driven compressor manufacturers, supported by combustor manufacturers. The described multi-shaft combustion turbine can be commercially offered by combustion turbine manufacturers, industrial steam turbine and turbo machinery manufacturers and/or by other packagers. The system described herein is applicable to all alternative modifications of combustion turbines.

Accordingly, there has been disclosed an improved electric power generating system. While illustrative embodiments of the present invention have been disclosed herein, it is understood that various modifications and adaptations to the disclosed embodiments will be apparent to those of ordinary skill in the art and it is only intended that this invention be limited by the scope of the appended claims.

I claim:
1. An electric power generation system comprising: a single power shaft assembly including a combustion turbine having a compressor, an expansion turbine, a combustor feeding said expansion turbine, an electrical generator, and means for coupling said expansion turbine to drive said compressor and said electrical generator;

at least one additional shaft assembly including an intercooler, a compressor, an expansion turbine, a combustor feeding said expansion turbine, and means for driving the compressor of the additional shaft assembly, said compressor of the at least one additional shaft assembly being constructed and arranged to have a pressure ratio greater than a pressure ratio of the expansion turbine of said at least one additional shaft assembly which is fluid connected to said single power shaft assembly for pressure unloading the compressor of said single power shaft assembly;

a recuperator; and an exhaust stack, said single power shaft assembly, said at least one additional shaft assembly and said recuperator being connected to define a thermal cycle with an air and gas path that passes through the compressor of said single power shaft assembly, through the intercooler and compressor of said at least one additional shaft assembly, through said recuperator, through the combustor and expansion turbine of said at least one additional shaft assembly and through the combustor and expansion turbine of said single power shaft assembly, and finally exhausting through said recuperator to said exhaust stack.

2. The system of claim 1 further comprising at least one supplementary duct burner located downstream of said single power shaft assembly expansion turbine and upstream of said recuperator.

3. The system of claim 1 further comprising means for providing water for cooling said intercooler.

4. The apparatus of claim 1 further comprising at least one saturator positioned between the highest pressure compressor discharge and said recuperator.

5. The apparatus of claim 4 further comprising an aftercooler positioned between the highest pressure compressor discharge and said at least one saturator.

6. The apparatus of claim 4 further comprising at least one water heater utilizing available heat from the power shaft assembly expansion turbine exhaust and supplying hot water to said at least one saturator.

7. The apparatus of claim 6 further comprising at least one duct burner positioned between the power shaft assembly expansion turbine exhaust and said recuperator.

8. The apparatus of claim 7 further comprising at least one duct burner positioned between the recuperator exhaust and the water heaters.

9. The apparatus of claim 1 further comprising a multi-pressure heat recovery steam generator positioned between said recuperator and said exhaust stack.

10. The system of claim 1 wherein said expansion turbine of said single power shaft assembly is a simple-cycle combustion turbine constructed and arranged to operate at an inlet temperature of at least 2300° F.

11. The system of claim 1 wherein said expansion turbine of said at least one additional shaft assembly is an industrial expander constructed and arranged to operate at an inlet temperature in the range of 1400° F. to 1600° F.

12. The system of claim 1, wherein said turbine of said at least one additional shaft assembly is constructed and arranged to have an inlet temperature less than an inlet temperature of said turbine of said single power shaft assembly.

13. The system of claim 1 wherein a plurality of additional shaft assemblies are provided such that said single power shaft assembly, said plurality of additional shaft assemblies and said recuperator are connected to define a thermal cycle with an air and gas path that passes through the compressor of said single power shaft assembly, through the intercooler and compressor of each additional shaft assembly of said plurality of additional shaft assemblies in a first predetermined ordered sequence, through said recuperator, through the combustor and expansion turbine of each additional shaft assembly of said plurality of said additional shaft assemblies in a second predetermined ordered sequence and through the combustor and expansion turbine of said single power shaft assembly, and finally exhausting through said recuperator to said exhaust stack, said compressor of each additional shaft assembly being constructed and arranged to have a pressure ratio greater than a pressure ratio of the cooperating expansion turbine for pressure unloading the compressor of said single power shaft assembly further.

14. The system of claim 1 wherein said system includes only one electrical generator which is said electrical generator of said single power shaft assembly.

* * * * *